US007016414B2

(12) United States Patent
Chen et al.

(10) Patent No.: US 7,016,414 B2
(45) Date of Patent: Mar. 21, 2006

(54) METHOD AND SYSTEM FOR SKIPPING DECODING OF OVERLAID AREAS OF VIDEO

(75) Inventors: Yingwei Chen, Briarcliff Manor, NY (US); Shaomin Peng, Yorktown Heights, NY (US); Tse-Hua Lan, Ossining, NY (US); Zhun Zhong, Croton-On-Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 638 days.

(21) Appl. No.: 10/082,859

(22) Filed: Oct. 19, 2001

(65) Prior Publication Data

US 2003/0076885 A1 Apr. 24, 2003

(51) Int. Cl.
*H04N 7/18* (2006.01)

(52) U.S. Cl. .......................... 375/240.15; 375/240.25; 375/240.13

(58) Field of Classification Search .............................. 375/240.11–240.17, 240.25–240.29
See application file for complete search history.

(56) References Cited

U.S. PATENT DOCUMENTS 6,553,150 B1 * 4/2003 Wee et al. .................. 382/243
6,758,540 B1 * 7/2004 Adolph et al. ......... 375/240.26
6,760,378 B1 * 7/2004 Conklin ................ 375/240.16

FOREIGN PATENT DOCUMENTS

EP 0984633 7/1999

OTHER PUBLICATIONS

Patent Abstracts of Japan, vol. 2000, No. 01, Jan. 31, 2000 & JP 11 298857 A, Oct. 29, 1999 & US 6462 744 B1 Oct. 8, 2002, abstract, col. 11, lines 53-61, col. 14, line 42, col. 15, line 2, figures 9, 10A, 10B, 13c, 17.
Patent Abstracts of Japan, vol. 1999, No. 11, Sep. 30, 1999 & JP 11 155147 A, Jun. 8, 1999, abstract.

* cited by examiner

*Primary Examiner*—Andy Rao

(57) ABSTRACT

A system and method that reduces computational complexity of a decoder by identifying a skippable region in an overlaid area. The invention provides a system for processing encoded video data, comprising: an analysis system that determines if a current video frame having an overlaid area acts as a reference for future video frames; and a system for identifying a skippable region in the overlaid area. The invention may also include a system for identifying a portion of the overlaid area as the skippable based on analysis of motion vectors or motion vector ranges.

14 Claims, 4 Drawing Sheets

METHOD AND SYSTEM FOR SKIPPING DECODING OF OVERLAID AREAS OF VIDEO

BACKGROUND OF THE INVENTION

1. Technical Field

The present invention relates generally to video processing, and more particularly relates to a system and method of effectively skipping decoding of overlaid areas of video without suffering a loss in quality.

2. Related Art

As new video-based technologies enter the marketplace, systems having advanced digital processing features, such as picture-in-picture, have become more desirable. Moreover, with the advent of technologies such as web-based and wireless-based video communications, the ability to efficiently process encoded video data has become particularly critical.

In systems that utilize encoded video with inter-picture coding, such as MPEG-2, MPEG-4, H.263, H.26L, and H.263++, the decoding of video data is recognized as an extremely computationally intensive process. When advanced processing features such as picture-in-picture are used, the computational requirements of the system are further exacerbated due to the need to decode and process multiple streams of video data, or process applications such as web browsing. Because typical decoding environments (e.g., a video phone) demand that decoding occur as close to real-time as possible with minimal delay, addressing the computational requirements of the decoder remains an ongoing challenge. In order to implement a video system with such advanced capabilities, the system must either include a processor that can provide the necessary amount of computational bandwidth, or include some means for reducing the processing overhead.

Unfortunately, providing a processor with large amounts of computational bandwidth significantly drives up the cost of the system. The other option, reducing the processing overhead, generally requires degradation to the video quality in order to implement the advanced features. While in certain circumstances some degradation to the video quality may be acceptable, it is always preferable to provide the highest quality video image possible. Accordingly, techniques are required that can provide advanced video features in a computationally efficient manner that will not cause degradation to the video image.

SUMMARY OF THE INVENTION

The present invention addresses the above-mentioned problems, as well as others, by providing a system and method that reduces computational complexity by identifying a skippable region in an overlaid area. In a first aspect, the invention provides an optimization system for processing encoded video data, comprising: a frame analysis system that determines if a current video frame having an overlaid area acts as a reference for future video frames; and a system for identifying a skippable region in the overlaid area.

In a second aspect, the invention provides a program product, stored on a recordable medium, that when executed processes encoded video data, the program product comprising: means for determining if a current video frame having an overlaid area acts as a reference for future video frames; and means for identifying a skippable region in the overlaid area.

In a third aspect, the invention provides a method of processing encoded video data, comprising the steps of: determining if a current video frame having an overlaid area acts as a reference for future video frames; and identifying a skippable region in the overlaid area.

BRIEF DESCRIPTION OF THE DRAWINGS

An exemplary embodiment of the present invention will hereinafter be described in conjunction with the appended drawings, where like designations denote like elements, and.

DETAILED DESCRIPTION OF THE INVENTION

Overview

This invention describes a method and system for effectively reducing the amount of processing needed for decoding compressed video by skipping processing of overlaid or hidden areas of video. The invention performs this in a manner that does not affect normal processing of other pictures or other parts of the current picture and therefore achieves the desired processing reduction without degrading the current picture or video quality. The methods and systems described herein can be applied to all prediction based video compression methods (e.g., MPEG-2, MPEG-4, H.263, etc.).

For compressed video with inter-picture coding (where the decoding of one picture may depend on other decoded pictures), simply skipping the decoding of the overlaid area could result in prediction errors. Such predictions errors will in turn result in an unacceptable video quality. With the current invention, video decoding is only skipped for identified regions of overlaid areas for which there are no dependencies (i.e., correct decoding of other pictures do not depend on the skipped regions). Accordingly, one aspect of the invention is identifying parts of an overlaid area in a video that can be skipped without affecting video quality and correct decoding of other parts of video.

Detailed Embodiments

Figure 1:
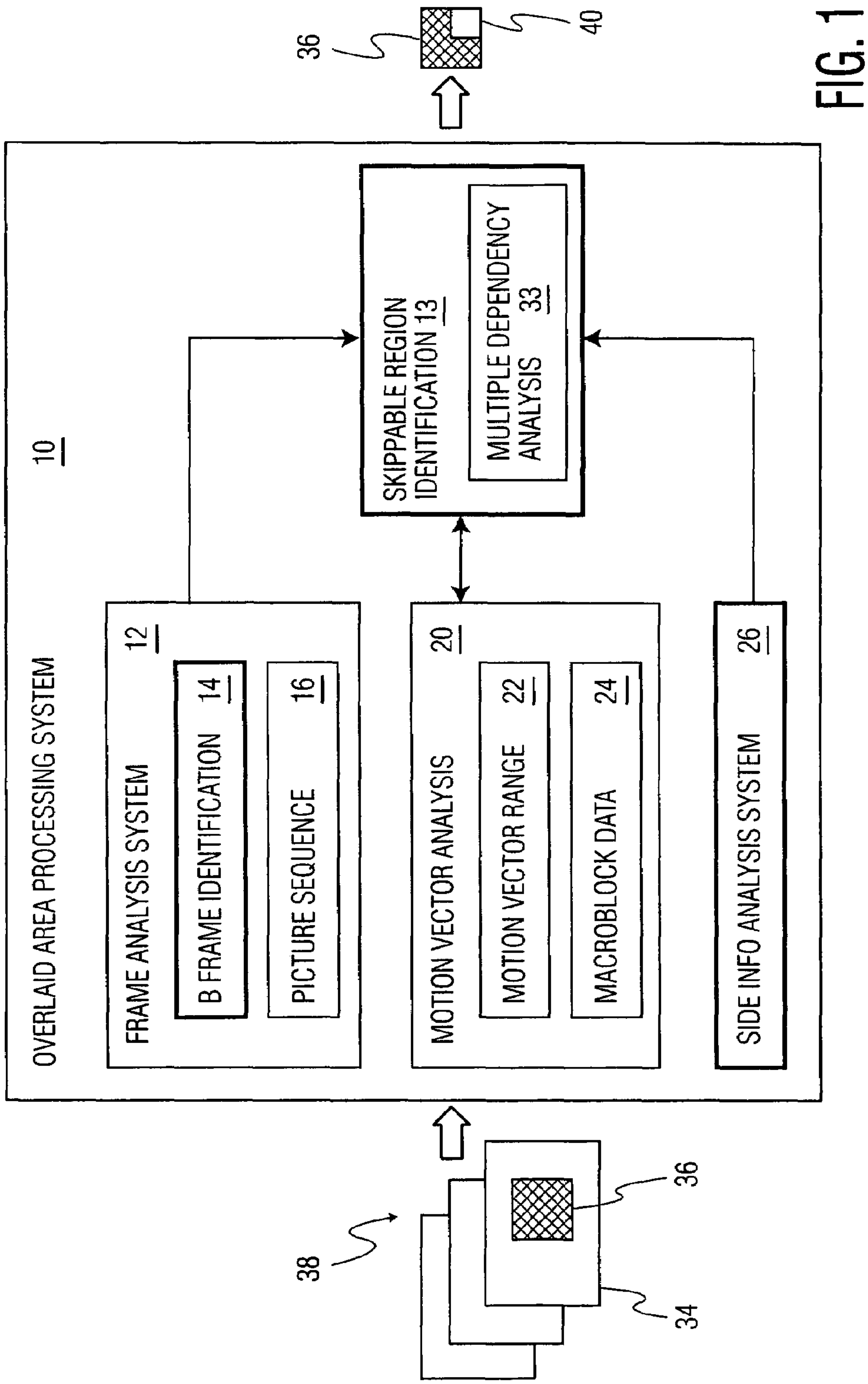
FIG. 1 depicts a block diagram of a system for processing an overlaid area in a compressed video image in accordance with an embodiment of the present invention.

Referring now to the figures, FIG. 1 depicts an overlaid area processing system ("processing system") 10 for processing a current picture 34 in a stream of pictures 38 having an overlaid area 36. In particular, processing system 10 optimizes the processing (e.g., decoding) of pictures having an overlaid area by identifying a skippable region 40 in the overlaid area 36 that does not need to be processed. Processing system 10 may include a frame analysis system 12, a motion vector analysis system 20, a side info analysis system 26, and a skippable region identification system 13. Frame analysis, motion vector analysis, and/or side info analysis systems 12, 20, 26 can be implemented to determine dependencies in future frames that reference the current picture 34.

Once the dependencies are determined, skippable region identification system 13 identifies and/or outputs the portion 40 of the overlaid area 36 that can be skipped. In some cases, as discussed below, the whole overlaid area 36 of the current picture 34 can be skipped, and in other cases, only a portion of the overlaid area 36 can be skipped.

It is known that inter-picture coding schemes, such as MPEG-2, contain pictures that will not be referenced. These pictures are identified by frame analysis system 12 based on either picture type or picture sequence. When one of these pictures is identified, the entire overlaid area can be skipped. Examples of pictures whose overlaid areas can be skipped include: (1) B (bi-directional) pictures in MPEG-1, MPEG-2, H.263, H.26L, H.263++, MPEG-4, and other prediction based video compression methods; (2) Standalone I (intra) pictures; (3) Last P (predictive) picture in a GOP (group of pictures) if no following B picture in the same GOP; and (4) Last P picture in GOP if there are subsequent B pictures in the same GOP that use only backward prediction. To identify these pictures, frame analysis system 12 includes a B-frame identification module 14 for identifying B pictures (case 1), and a picture sequence identification module 16 for identifying pictures/picture sequences that meet the requirements of cases 2–4.

Figure 2:
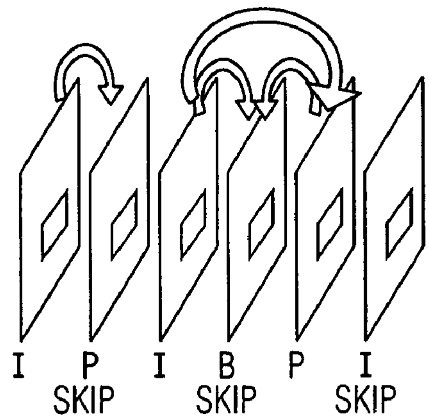
FIG. 2 depicts a stream of pictures having an overlaid area.

Picture sequence identification module 16 examines both the picture type as well as the picture sequence to determine if the picture serves as a reference frame for other pictures. For example, FIG. 2 depicts a sequence of pictures in which it can be determined that certain pictures do not serve as reference frames. Specifically, based on the criteria outlined above, the B-picture, first P-picture, and last I-picture do not act as references. Accordingly, the overlaid area for these pictures could not serve as a reference frame for other pictures and any error or distortion that occurs in these pictures is contained and not spread to other pictures. Therefore, the whole portion of the overlaid area could be skipped without any effect on the video quality of both the current picture and subsequent pictures.

Figure 3:
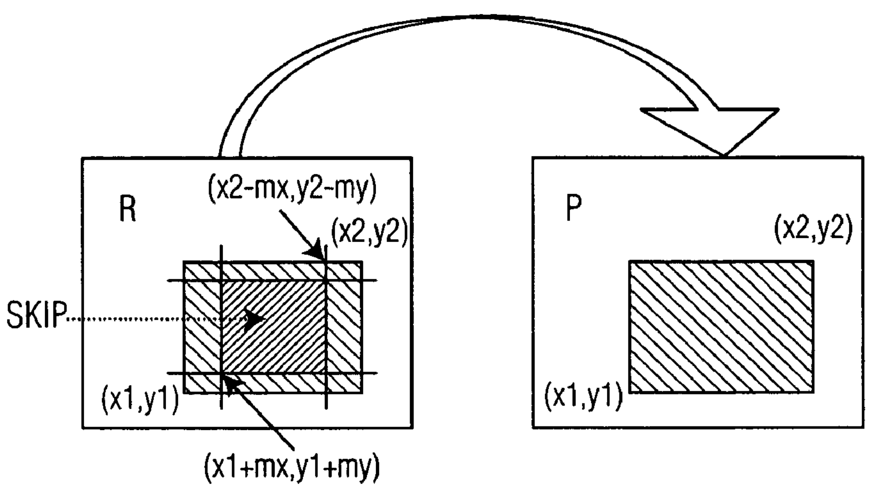
FIG. 3 depicts a predicted picture and skipped region in a reference picture determined based on motion vector range data.

The present invention further recognizes that even if the current picture serves as reference for decoding other pictures, processing of a portion of the overlaid region may still be skipped without affecting the accurate decoding of other pictures. FIG. 3 depicts the inter-dependency of a reference frame R and a frame P that is motion-predicted from the reference frame R. Because frame P depends on frame R, the overlaid area in R cannot be totally skipped. The problem is then to identify part of the overlaid area in R that can be skipped without affecting decoding frame P. Motion vector analysis system 20 provides two possible mechanisms for identifying a region 40 of an overlaid area 36 that can be skipped even if the current picture serves as a reference for the decoding of other pictures. The first mechanism 22 utilizes motion vector range data to identify skippable regions and the second mechanism 24 utilizes actual motion vectors or macroblock data to determine which macroblocks in the current frame can be skipped.

Referring to FIG. 3, an implementation of the first mechanism 22 using motion vector ranges is described in further detail. Assume the overlaid area in R is the rectangular region between (x1,y1) and (x2,y2), and the motion vector range for frame P is (mx,my), meaning motion prediction cannot exceed an area bounded by (mx,my) from each macroblock in P. The area that can be skipped in frame R is a sub-area of (x1,y1)~(x2,y2), described as (x1+mx,y1+my) ~(x2−mx,y2−my). Motion vector range can be obtained through f codes transmitted in the picture coding extension. All motion vectors in the examined frame must fall within the range. Therefore, the motion vector range is available upon decoding the picture coding extension, which is at the very beginning of a frame.

If there are multiple frames that are predicted from frame R, only the cross set, or overlap, of the skippable areas determined from those multiple frames is skippable. The process of calculating this cross set is multiple dependency analysis system 33.

Figure 4:
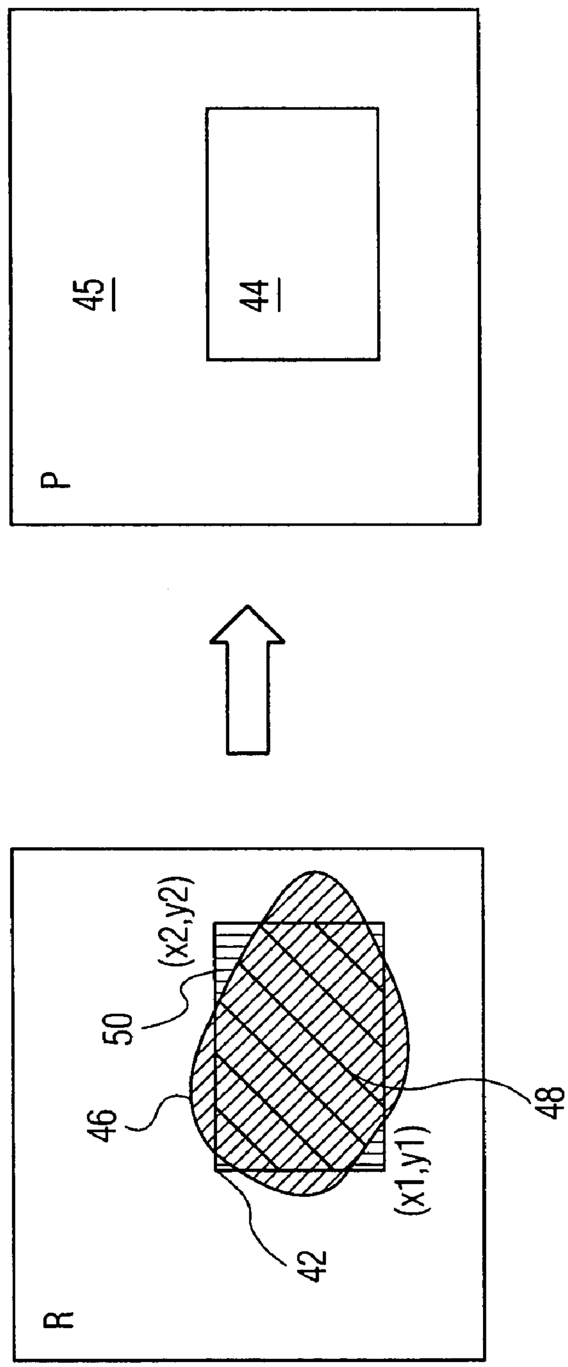
FIG. 4 depicts a predicted picture and skipped region in a reference picture determined based on actual motion vectors of the predicted frame.

An implementation of the second mechanism 24 using actual motion vectors is described in FIG. 4. FIG. 4 includes a reference frame R and a predicted frame P, each having an overlaid area 42 and 44, respectively. In this example, because P also includes an overlaid area 44, the concern is whether the macroblocks outside 45 of the overlaid area 44 reference data, or prediction macroblocks, inside the overlaid area 42 of frame R. Thus, for each macroblock outside 45 the overlaid area 44 in frame P, the corresponding prediction macroblocks in frame R can be found using the actual motion vectors in frame P. In the example shown in FIG. 4, macroblock region 46 is identified as a region that does not include any prediction macroblocks for frame P. Accordingly, the skippable region 48 can be calculated as the overlap of macroblock region 46 (which does not include an prediction macroblocks) and overlaid area 42. Skippable region 48 thus comprises the overlaid area less the prediction macroblocks identified in the overlaid area of the current video frame. Any prediction macroblocks that reside within the overlaid area (e.g., region 50) must however be processed.

For both mechanisms provided by motion vector analysis system 20, it should be noted that if picture P later serves as reference for other pictures, its own areas that can be skipped are also determined by the same procedure, and most likely will be smaller than the overlaid area, i.e., (x1,yl)~(x2,y2) for the first case.

Figure 5:
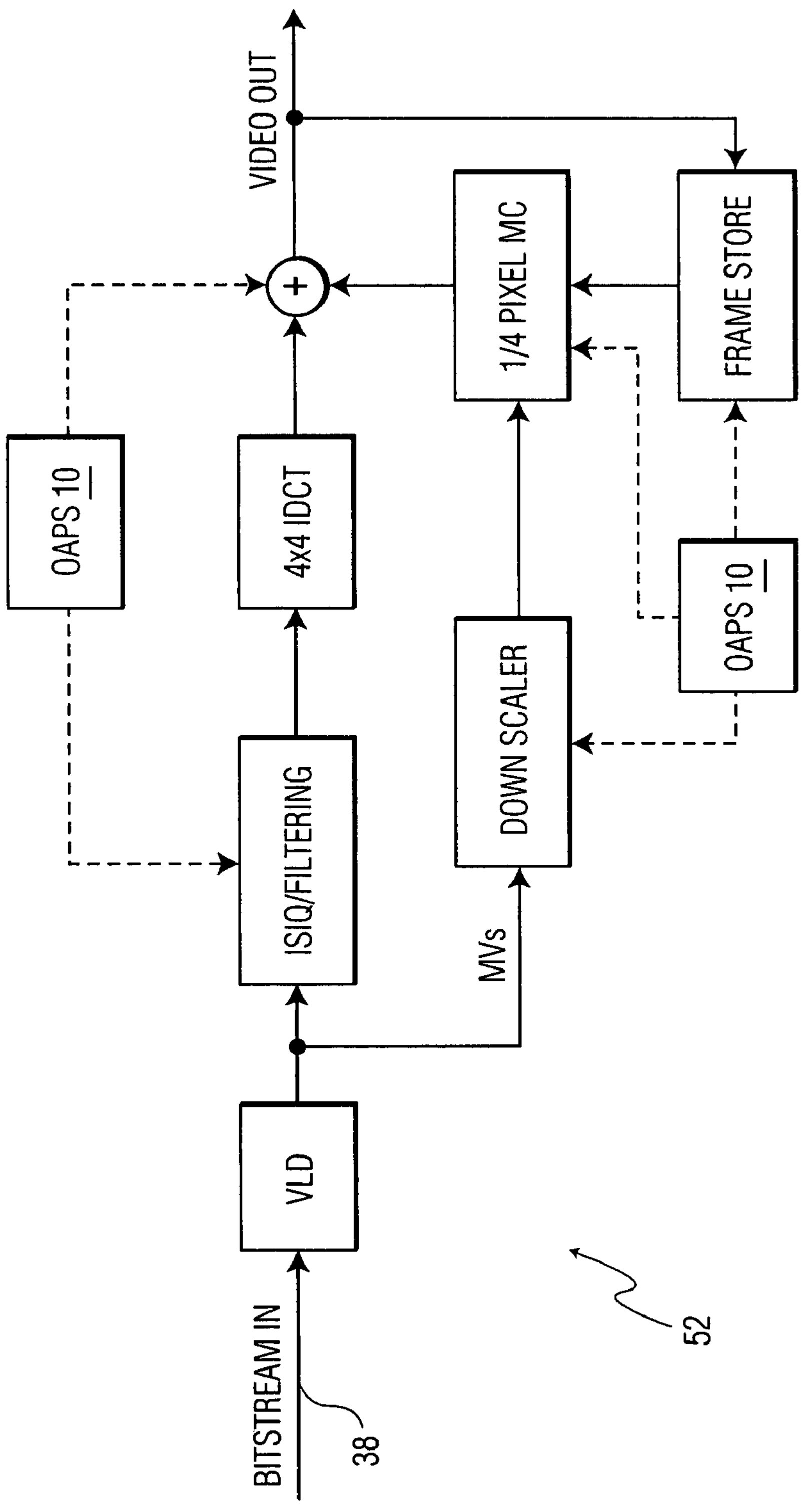
FIG. 5 depicts a decoder having overlaid area skipping capabilities.

Referring to FIG. 5, an exemplary MPEG-2 decoder 52 is depicted. Decoder 52 includes various operations that can incorporate the overlaid area processing system (OAPS) 10 to reduce computational complexity. In particular, OAPS 10 can be applied to one or more of inverse scanning, inverse quanitization, inverse DCT (or other transform such as wavelet), motion compensation and residual adding.

Implementation Details

Specifics of the implementation of the invention depend on the types of information carried in the incoming compressed video bitstream 38. There are three scenarios:

I. Video Bitstream Without Side Information and Decoding Without Delay (Other Than Standard Delay Imposed by Bit Buffering).

In this case, the decoder does not have knowledge of the motion vector range or actual motion vectors used in frame P while decoding frame R. Hence the decoder can skip decoding the overlaid area in B pictures only.

II. Video Bitstream Without Side Information, but Decoding with Additional Delay in Addition to Skipping Areas as Described in "Scenario I."

Here, the decoder can "look ahead" and obtain information on subsequent frames. The types of skippable areas depend on the type of information available in subsequent frames. The types of skippable areas depend on the type of information the decoder obtains:

A. Picture Types of Subsequent Pictures.

The decoder uses this information to determine if the current picture (if not B) is a reference for any future frames. For example, if the next picture is I or P, then the current picture is not a reference picture and the whole overlaid area can be skipped. However, if the next picture is a P picture and no further detailed information is available, the decoder must decode the entire current frame.

B. Picture Types and Motion Vector Information of Subsequence Pictures.

In addition to sub-scenario IIA, the decoder can selectively skip some areas even if the current picture is a reference for other frames. Information from "looking-ahead" on motion vector range or actual motion vectors in frames the current frame predicts to can be utilized as described in "skippable areas," case B to determine which areas to skip in the current frame.

III. Video Bitstream with Side Information.

If the video bitstream carries side information similar to that obtained by "look-ahead" in scenario II, the decoder can execute similar operations as those described in scenario II using (side information analysis system 26) without imposing additional delay or examining subsequent pictures.

It is understood that the systems, functions, mechanisms, methods, and modules described herein can be implemented in hardware, software, or a combination of hardware and software. They may be implemented by any type of computer system or other apparatus adapted for carrying out the m et hods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention have been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. An optimization system for processing encoded video data, comprising:

a frame analysis system that determines if a current video frame having an overlaid area acts as a reference for future video frames; and a system for identifying a skippable region in the overlaid area, wherein the frame analysis system examines a picture type of the current video frame, and wherein the identification system identifies the entire overlaid area as the skippable region if the current video frame comprises a B picture.

2. An optimization system for processing encoded video data, comprising:

a frame analysis system that determines if a current video frame having an overlaid area acts as a reference for future video frames; and a system for identifying a skippable region in the overlaid area, wherein the frame analysis system examines a sequence of video frames, and wherein the identification system identifies the entire overlaid area as the skippable region if none of the sequence of video frames acts as reference frames.

3. An optimization system for processing encoded video data, comprising:

a frame analysis system that determines if a current video frame having an overlaid area acts as a reference for future video frames; and a system for identifying a skippable region in the overlaid area, further comprising a motion vector analysis system that calculates a motion vector range for the current video frame.

4. The optimization system of claim 3, wherein the skippable region comprises the overlaid area less an area defined by the motion vector range.

5. An optimization system for processing encoded video data, comprising:

a frame analysis system that determines if a current video frame having an overlaid area acts as a reference for future video frames; and a system for identifying a skippable region in the overlaid area, further comprising a motion vector analysis system that examines motion vectors in a predicted frame that references the current video frame in order to identify prediction macroblocks in the overlaid area of the current video frame.

6. The optimization system of claim 5, wherein the skippable region comprises the overlaid area less the prediction macroblocks identified in the overlaid area of the current video frame.

7. The optimization system of claim 5, wherein the predicted frame includes the overlaid area, and wherein the motion vector analysis system does not examine motion vectors in the overlaid area of the predicted frame.

8. An optimization system for processing encoded video data, comprising:

a frame analysis system that determines if a current video frame having an overlaid area acts as a reference for future video frames; and a system for identifying a skippable region in the overlaid area, wherein the frame analysis system determines a plurality of predicted frames that reference the current video frame; wherein the identification system identifies a plurality of skippable regions; and wherein a final skippable region is determined as a cross set of each of the identified skippable regions.

9. A program product, stored on a recordable medium, that when executed processes encoded video data, the program product comprising:

means for determining if a current video frame having an overlaid area acts as a reference for future video frames; and means for identifying a skippable region in the overlaid area, further comprising means for calculating a motion vector range for a predicted frame that references the current video frame.

10. The program product of claim 9, wherein the skippable region comprises the overlaid area less an area defined by the motion vector range.

11. A program product, stored on a recordable medium, that when executed processes encoded video data, the program product comprising:

means for determining if a current video frame having an overlaid area acts as a reference for future video frames; and means for identifying a skippable region in the overlaid area, further comprising means for examining motion vectors in a predicted frame that references the current video frame to identify prediction macroblocks in the current video frame.

12. The program product of claim 11, wherein the skippable region comprises the overlaid area less the identified prediction macroblocks identified in the overlaid area.

13. A method of processing encoded video data, comprising the steps of:

determining if a current video frame having an overlaid area acts as a reference for future video frames; and identifying a skippable region in the overlaid area, wherein the identifying step comprises the steps of:

calculating a motion vector range for a predicted frame that references the current video frame; and identifying the skippable region as comprising the overlaid area less an area defined by the motion vector range.

14. A method of processing encoded video data, comprising the steps of:

determining if a current video frame having an overlaid area acts as a reference for future video frames; and identifying a skippable region in the overlaid area, wherein the identifying step comprises the steps of:

examining motion vectors in a predicted frame that references the current video frame to identify prediction macroblocks in the current video frame; and identifying the skippable region as comprising the overlaid area less the prediction macroblocks identified in the overlaid area.

* * * * *